(12) United States Patent
Fuller et al.

(10) Patent No.: US 9,008,694 B2
(45) Date of Patent: Apr. 14, 2015

(54) INDOOR/OUTDOOR DIFFERENTIATION USING RADIO FREQUENCY (RF) TRANSMITTERS

(75) Inventors: Richard Fuller, Morgan Hill, CA (US); Steven Malkos, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/538,296

(22) Filed: Jun. 29, 2012

(65) Prior Publication Data

US 2014/0004876 A1    Jan. 2, 2014

(51) Int. Cl.
*H04W 24/00* (2009.01)
*G01C 21/20* (2006.01)
*G01S 19/48* (2010.01)
*G01S 5/02* (2010.01)
*G01S 19/34* (2010.01)

(52) U.S. Cl.
CPC ............. *G01C 21/206* (2013.01); *G01S 5/0236* (2013.01); *G01S 19/34* (2013.01); *G01S 19/48* (2013.01)

(58) Field of Classification Search
USPC ........................ 455/63.1, 114.2, 456.1, 456.6
See application file for complete search history.

(56) References Cited

U.S. PATENT DOCUMENTS

| | | | |
|---|---|---|---|
| 7,184,745 B2 * | 2/2007 | Ballantyne et al. | ........ 455/404.2 |
| 8,339,372 B2 | 12/2012 | Rofougaran | |
| 2003/0182053 A1 | 9/2003 | Swope et al. | |
| 2004/0176127 A1 * | 9/2004 | Ballantyne et al. | ........ 455/552.1 |
| 2007/0239813 A1 | 10/2007 | Pinder et al. | |
| 2010/0291949 A1 * | 11/2010 | Shapira et al. | ............. 455/456.1 |
| 2011/0156952 A1 | 6/2011 | Battacharya et al. | |
| 2011/0172906 A1 | 7/2011 | Das et al. | |
| 2011/0199259 A1 | 8/2011 | Karaoguz et al. | |
| 2013/0183999 A1 * | 7/2013 | Jovicic et al. | ............. 455/456.1 |
| 2014/0002307 A1 | 1/2014 | Mole et al. | |

FOREIGN PATENT DOCUMENTS

EP    2 034 271 A1    11/2009

(Continued)

OTHER PUBLICATIONS

European Search Report directed to related European Patent Application No. EP 13 00 3196, Munich, Germany, mailed Nov. 27, 2013; 3 pages.

(Continued)

*Primary Examiner* — Khalid Shaheed
(74) *Attorney, Agent, or Firm* — Sterne, Kessler, Goldstein & Fox P.L.L.C.

(57) ABSTRACT

An apparatus and method is provided for indoor/outdoor transition detection of devices to improve selection of the navigation algorithms. A mobile device can scan resources such as radio frequency (RF) sources in its vicinity and compare the scanned resources with a set of indoor-only resources to determine whether the mobile device is located inside a structure (e.g., indoor) or outside the structure (e.g., outdoor). The techniques provide an apparatus and method to determine when a device transitions between indoor and outdoor to efficiently use appropriate algorithm for positioning and/or navigation.

19 Claims, 5 Drawing Sheets

(56) References Cited

FOREIGN PATENT DOCUMENTS

| | | |
|---|---|---|
| EP | 2 327 995 A2 | 6/2011 |
| EP | 2 364 049 A1 | 9/2011 |
| EP | 2 618 182 A1 | 7/2013 |
| JP | 2000-111648 A | 4/2000 |
| TW | 201131463 A1 | 9/2011 |
| TW | 201202733 A1 | 1/2012 |
| WO | WO 2012/036028 A1 | 3/2012 |

OTHER PUBLICATIONS

Communication from the Examining Division of the European Patent Office directed to related European Patent Application No. EP 13 00 3196, Munich Germany, Mailed Dec. 16, 2013; 5 pages.

English-Language Abstract for Japanese Patent Publication No. 2000-111648 A, published Apr. 21, 2000; 2 pages.

Office Action directed to related Taiwanese Patent Application No. 101147546, mailed Aug. 4, 2014; 7 pages.

* cited by examiner

INDOOR/OUTDOOR DIFFERENTIATION USING RADIO FREQUENCY (RF) TRANSMITTERS

FIELD OF THE PRESENT INVENTION

The present invention relates generally to positioning and/or navigation algorithms and, more particularly, to a method and system for indoor/outdoor transition detection of devices to improve selection of positioning and/or navigation algorithms.

BACKGROUND

Description of the Related Art

Many devices have the capability to use positioning and/or navigation algorithms (hereinafter referred to as navigation algorithm) to determine their location and/or to track their movements. The navigation algorithms can be classified in numerous ways, one way is to divide it into two general categories based on whether the device is inside a structure (e.g., indoor) or outside of the structure (e.g., outdoor). If the device is being used outdoor, algorithms based on satellite navigation can be used. The satellite navigation can include, but not limited to, Global Navigation Satellite System (GNSS) such as Global Positioning System (GPS), Galileo, Quazi-Zenith Satellite System, Globalnaya Navigatsionnaya Sputnikovaya Sistema (GLONASS), etc.

In contrast, when the device is being used indoor, navigation algorithms based on Indoor Positioning System (IPS) can be used to determine the location and/or to track the movements of the device. GNSS signals are generally not available to establish indoor locations, since microwaves will be attenuated and scattered by roofs, walls and other objects. In IPS, instead of relying on satellite signals, the system uses nearby nodes with known positions. Various optical, radio, acoustic, etc. technologies can be used for IPS. For example, cellular system, radio frequency transmitters in WiFi networks (e.g. access points), etc. can be used for indoor positioning.

Current implementations, however, cannot effectively determine when a device transitions from indoor to outdoor or vice versa. Accordingly, the devices cannot efficiently use the correct algorithm for positioning or tracking purposes when the transition occurs, which would result in inaccurate calculations. For example, when a device enters a structure, such as a commercial area, a shopping mall, an airport terminal, etc., the device can still receive, for example, GPS signals at an attenuated level. The device may still use outdoor navigation algorithms even though the device is indoors, leading to possible erroneous results due low signal level and indoor multipath effects.

SUMMARY

Apparatuses and methods are needed to efficiently determine when a device transitions between indoor and outdoor to effectively use the appropriate navigation algorithm.

According to a first embodiment of the disclosure, there is provided a method for receiving radio frequency (RF) signals from a plurality of RF sources and determining information associated with the plurality of RF sources. The method further includes comparing the determined information with information associated with a set of indoor-only RF sources and determining whether the plurality of RF sources include at least one of the set of indoor-only RF sources.

According to another embodiment, an apparatus is provided that includes a radio receiver and a control logic. The radio receiver is configured to receive radio frequency (RF) signals from a plurality of RF sources. The control logic is configured to determine information associated with the plurality of RF sources, compare the determined information with information associated with a set of indoor-only RF sources and determine whether the plurality of RF sources include at least one of the set of indoor-only RF sources.

Another embodiment includes an article of manufacture including a computer-readable storage medium having instructions stored thereon, execution of which by a computing device causes the computing device to perform operations including receiving radio frequency (RF) signals from a plurality of RF sources and determining information associated with the plurality of RF sources. The operations further include comparing the determined information with information associated with a set of indoor-only RF sources and determining whether the plurality of RF sources include at least one of the set of indoor-only RF sources.

Further features and advantages of the disclosure, as well as the structure and operation of various embodiments of the disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present disclosure refers to the accompanying drawings that illustrate exemplary embodiments consistent with this disclosure. Other embodiments are possible, and modifications can be made to the embodiments within the spirit and scope of the present disclosure. Therefore, the detailed description is not meant to limit the present disclosure. Further, the scope of the present invention is defined by the appended claims.

It would be apparent to one of skill in the art that aspects of the present disclosure, as described below, can be implemented in many different embodiments of software, hardware, firmware, and/or the entities illustrated in the figures. Any actual software code with the specialized control of hardware to implement the present disclosure is not limiting of the present disclosure. Thus, the operational behavior of the present disclosure will be described with the understanding that modifications and variations of the embodiments are possible, given the level of detail presented herein.

This specification discloses one or more embodiments that incorporate the features of this disclosure. The disclosed embodiment(s) merely exemplify the disclosure. The scope of the disclosure is not limited to the disclosed embodiment(s). Further, the invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Moreover, terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B (eNode B)," home Node B (HNB)," "home access point (HAP)," or the like, are utilized interchangeably in the subject specification and drawings, and refer to a wireless network component or apparatus that serves and receives data, control, voice, video, sound, gaming, or substantially any data-stream or signaling-stream from a set of subscriber stations. It is noted that in the subject specification and drawing, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

Figure 1:
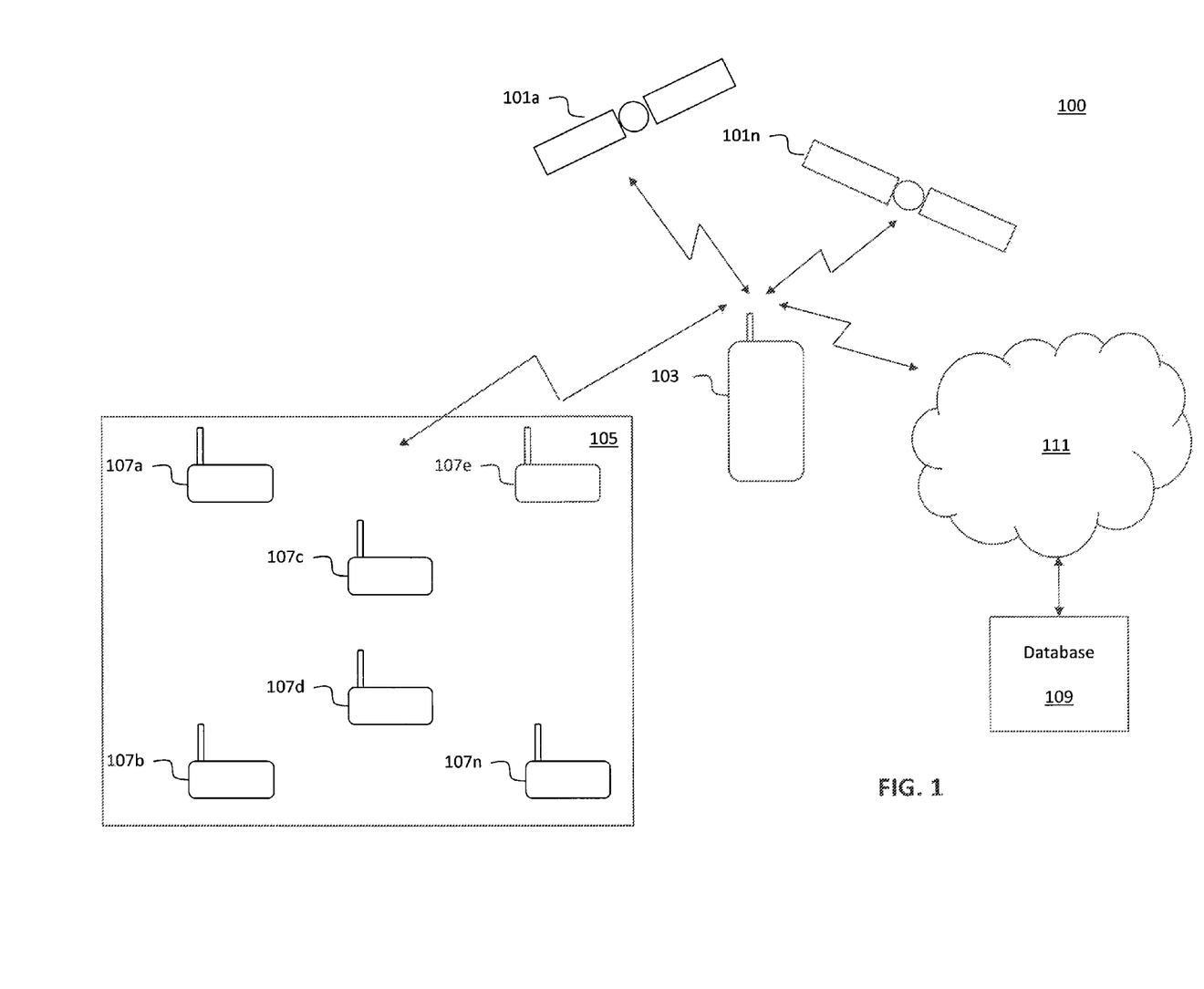
FIG. 1 illustrates a system, in accordance with an embodiment of the present disclosure.

FIG. 1 illustrates a system 100, according to an embodiment of the present disclosure. For example, system 100 illustrates a mobile device 103 that can detect its transition between indoor and outdoor locations so as to effectively use the appropriate navigation algorithm. For example, the mobile device 103 is configured to determine its location and/or track its movement using outdoor navigation algorithms based on input from satellites 101a-101n, and/or indoor navigation algorithms based on input from radio frequency sources 107a-107n, which are located inside a structure 105.

In one example, mobile device 103 can include, but is not limited to the following: a mobile phone, smartphone, personal digital assistant (PDA), navigation device, portable computer, etc., that can use outdoor navigation algorithms such as GNSS by communicating with the satellites 101a-101n. The outdoor navigation algorithms can result in more accurate location and/or navigation, when the mobile device 103 is outdoors, for example, outside of structure 105 (e.g. building). According to one example, satellites 101a-101n can be part of GPS, which includes, for example, up to 32 Medium Earth Orbit (MEO) satellites in six different orbital planes. Additionally or alternatively, satellites 101a-101n can be part of Galileo, which includes, for example, 30 MEO satellites. Although these exemplary systems are mentioned, it is noted that satellites 101a-101n can be part of any satellite navigation system. When mobile device 103 is located outdoors, it is preferable that mobile device 103 uses satellites 101a-101n for positioning and/or navigation purposes, to achieve superior accuracy.

When mobile device 103 transitions from outdoor to indoor, for example, mobile device 103 enters structure 105, and therefore mobile device 103 can use RF sources 107a-107n and indoor positioning algorithms to more accurately determine its location and/or navigate its movements. According to one example, RF sources 107a-107n can include, but not limited to, any wireless technology such as access points (e.g., used in wireless local area networks (WLAN), WiFi networks, WiMAX networks, Bluetooth networks, etc.), sensor arrays, etc. It is noted that although RF sources are disclosed as exemplary embodiments, other systems can be used for indoor positioning. These systems can use ambient lighting levels/60 HZ flicker, sound, etc. to determine indoor positioning and/or to determine that the mobile receiver 103 is located indoors.

In one example, mobile device 103 is capable of determining whether it is located indoors or outdoors, therefore, mobile device 103 can automatically use the appropriate navigation algorithm. According to one example, mobile device 103 can scan for signals, such as radio frequency signals, from a plurality of RF sources, such as a sub-set of RF sources 107a-107n. Based on the received signals, mobile device 103 can determine information associated with the plurality of the RF sources that are in the vicinity of mobile device 103. According to one embodiment, mobile device 103 can compare the determined information with a priori information (i.e. previously known) associated with a set of indoor-only RF sources. If the determined information associated with the plurality of RF sources in the vicinity of mobile device 103 includes all, or parts of, the information associated with the set of indoor-only RF sources, mobile device 103 can determine that it is located inside structure 105 (e.g., indoors) and therefore, mobile device 103 can decide to use indoor navigation algorithms for position determination.

However, if mobile device 103 determines that the determined information associated with the plurality of RF sources in the vicinity of mobile device 103 does not include any of information associated with the set of indoor-only RF sources, mobile device 103 can determine that mobile device 103 is located outside of structure 105 (e.g., outdoors) and therefore, mobile device 103 can use outdoor navigation algorithms for position determination.

According to one example, the determined information associated with each of the plurality of RF sources in the vicinity of mobile device 103 can include an identification (e.g. MAC address) associated with each of the RF sources. According to this example, mobile device 103 can compare the determined identifications of the plurality of RF sources in the vicinity of mobile device 103 to identifications of indoor-only RF sources to determine whether mobile device 103 is indoors or outdoors.

According to one embodiment, mobile device 103 can determine the set of the plurality of RF sources in the vicinity of mobile device 103 based on, for example, signal strength received from RF sources 107a-107n, the time of flight of the signals, the angle of arrival of the signals, and/or other characteristics of the received RF signals.

In one example, information associated with the set of indoor-only RF sources has been previously collected and is stored in a database 109, which can be accessed by mobile device 103. According to one example, mobile device 103 can communicate with database 109 through a communication network 111. In one example, communication network 111 can include, but is not limited to, personal area networks, local area network, mesh network, metropolitan area network, wide area network, mobile network (such as global system for mobile communications, personal communications service, digital advance mobile phone service, etc.), Internet, or the like. Although a separate database 109 is illustrated, it is noted that database 109 and/or a copy of database 109 can be included in mobile device 103 and/or can be downloaded to mobile device 103 when needed from the available communications network.

According to one example, when mobile device 103 is physically close to structure 105, mobile device 103 would be able to sense RF signals generated by a sub-set of the RF sources 107a-107n. Whereas, indoor-only RF sources are a different sub-set of the RF sources 107a-107n having RF signals that cannot be sensed by mobile device 103, when mobile device 103 is located outside of structure 105 (e.g., outdoor). These indoor-only RF sources are deep indoors and not visible from outside. For example, RF sources 107c and 107d are located in the center of structure 105, and therefore are not likely to be visible outdoors. (Herein, the term "visible", "RF visible" and the like, refers to being able to detect the corresponding RF signal, at or above, a predetermined signal amplitude or power threshold.) Therefore, if mobile device 103 can receive an RF signal from any of the RF sources in the set of indoor-only RF sources, mobile device 103 can determine that it has entered structure 105, and is indoors. Thus, mobile device 103 can automatically switch from outdoor navigation algorithms to indoor navigation algorithms. Alternatively or additionally, if mobile device 103 cannot receive any RF signal from RF sources in the set of indoor-only RF sources (i.e. not visible), mobile device 103 can determine that it has exited structure 105. Thus, mobile device 103 can automatically switch from an indoor navigation algorithm to an outdoor navigation algorithm. The determination of lack of signal detection may be implemented relative to some signal amplitude threshold.

As discussed in more detail below with respect to FIGS. 4A and 4B, a learning device (not shown, but can be a mobile device, such as a 103) can be used to build up database 109, which includes a set of indoor-only sources (such as indoor-only RF sources). According to one example, the learning device can be used to survey the outside of structure 105 to determine a first sub-set of RF sources 107a-107n (e.g., 107a, 107b, 107e, and 107n), where their RF signal can be detected outside of structure 105. Additionally, the learning device can be used to survey inside of structure 105 to determine a second sub-set of RF sources 107a-107n (e.g., 107a, 107b, 107c, 107d, 107e, and 107n), where their RF signals can be detected inside of structure 105. A comparison between the first and the second sub-sets can determine the set of indoor-only sources (e.g., 107c and 107d) for structure 105, which can be stored in database 109. Therefore, in the future, a mobile device 103 (may be the same as the learning device, or a different mobile device), detects one or of the indoor-only sources, an algorithm can make the determination that the mobile device is indoors.

According to one embodiment, indoor-only sources can be seeded manually inside the structure in the situation where no indoor-only sources are available. In this scenario, all RF sources are visible from outside, so one or more RF sources need to be planted deep inside structure 105 so that these newly planted sources are not visible outside the structure. According to another embodiment, crowdsourcing can be used to build up database 109. According to this example, a plurality of computing devices (such as, but not limited to, cellular phones, navigation devices, portable computers, etc.) that are carried by a plurality of users can be used to survey structures as the users traverse the structure, such as structure 105, to collect data associated with resources inside the structures. The collected data can be used to populate the a priori information in the database 109.

In one example, during the survey of structure 105, the learning device can determine a position estimate using the outdoor navigation algorithm, an uncertainty associated with the determined outdoor position estimate, and information associated with RF sources in the vicinity of the learning device. When the learning device moves, the learning device can determine a position estimate using the indoor navigation algorithm, an uncertainty associated with the determined indoor position estimate, and information associated with RF sources in the vicinity of the learning device at the new location. If the determined outdoor position estimate and indoor position estimates are close to each other (e.g., the distance between them is less than a threshold) and the determined uncertainties are small (e.g., less than a threshold), the learning device can conclude that an indoor/outdoor transition has happened. Therefore, a comparison between the list of RF sources sensed in each position can be used to determine indoor-only RF sources.

For example and without limitation, at a first position, a first list of RF sources is determined, a first location (based on outdoor algorithms) is determined, and a first uncertainty associated with the first location is determined. At a second position, a second list of RF sources is determined, a second location (based on indoor algorithms) is determined, and a second uncertainty associated with the second location is determined. Then the first and second locations are compared and the first and second uncertainties are also compared. If they are close, a determination is made that an indoor-outdoor transition has happened. Meaning, for example, the first position was outside and the second position was inside. Therefore, if the first and second lists of RF sources are compared to each other, the difference between the lists would be the indoor-only sources. Because at the first position (for example outside) the indoor-only sources are not detected, thus, the first list doesn't include any indoor-only source. At the second position (for example inside) the indoor-only sources are detected, thus, the second list includes indoor-only sources. Therefore, by comparing the first and the second list, the indoor-only sources are detected. In other words, the first and second locations and their uncertainties are determined based on the survey. The determined first and second locations and the uncertainties being close to each other is a trigger to compare the lists. The comparison of the lists determines the indoor-only sources.

According to another example, the learning device can be used to survey the outside of structure 105 to determine a first sub-set of RF sources 107a-107n (e.g., 107a, 107b, 107e, and 107n), where their RF signals can be detected outside of structure 105. Additionally, a survey map of sources inside structure 105 can be used to compare with the first sub-set of sources to determine the set of indoor-only sources for structure 105. In this example two lists of sources are compared with each other to determine the list of indoor-only source. A first list (first sub-set) is determined based on surveying outside of a structure. This first list includes all the sources that can be sensed outside of the structure. The second list is actually a map of source inside the structure. Therefore, the second list includes all RF sources that are sensed inside the structure including: (1) sources that can be sensed outside, and (2) indoor-only sources. Therefore, by comparing the first and the second list, a list of indoor-only sources is determined. In addition to the above exemplary methods, other methods can be used to generate database 109, as will be understood by those skilled in the arts based on the discussion provided herein.

Figure 2:
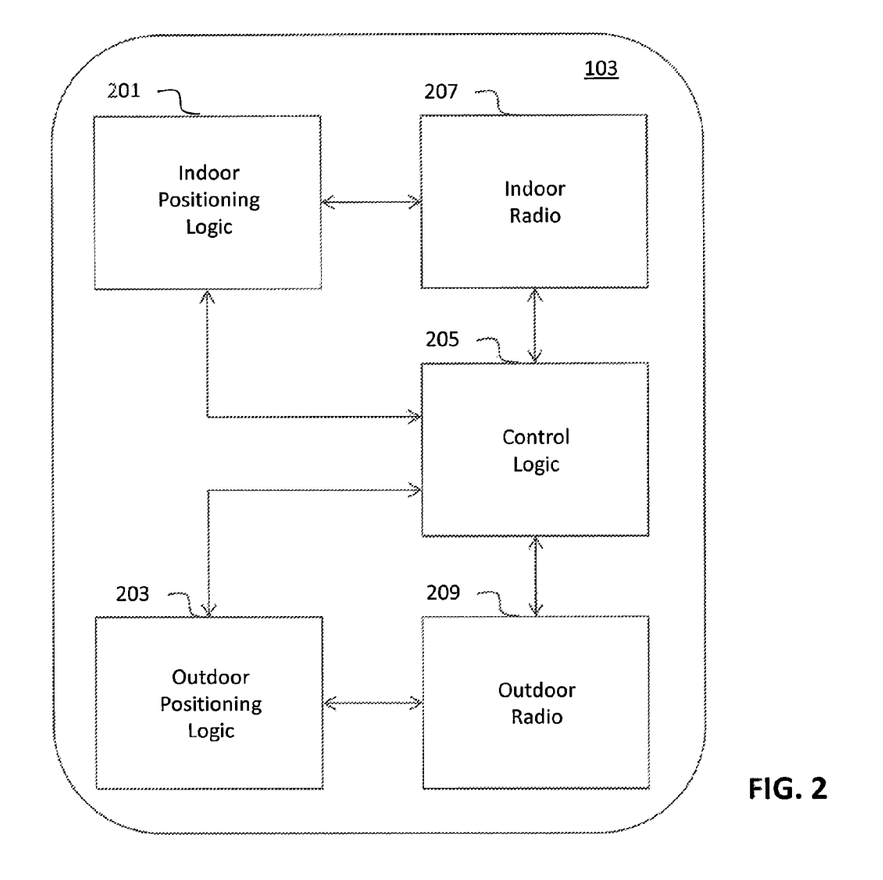
FIG. 2 illustrates a device, in accordance with an embodiment of the present disclosure.

FIG. 2 illustrates a device, according to an embodiment of the present disclosure. For example, the device illustrated in FIG. 2 can be implemented as mobile device 103 of FIG. 1. According to this example, mobile device 103 can include an indoor positioning logic 201, an outdoor positioning logic 203, and a control logic 205, in addition to other modules, all of which can be executed utilizing one or more processors.

According to one example, control logic 205 is configured to determine whether mobile device 103 has transitioned between indoors and outdoors, and based on this determination enable one of indoor positioning logic 201 or outdoor positioning logic 203 to perform positioning and/or navigation algorithms.

For example, when mobile device 103 is located outdoors, outdoor positioning logic 203, in cooperation with one or more radio receivers (e.g., outdoor radio 209), can use outdoor navigation algorithms to determine the position and/or track movements of mobile device 103. Additionally, when mobile device 103 is located indoor, indoor positioning logic 201, in cooperation with one or more radio receivers (e.g., indoor radio 207), can use indoor navigation algorithms to determine the position and/or track movements of mobile device 103. In this example, control logic 205 is configured to scan RF sources (in cooperation with one or more radio receivers (e.g., indoor radio 207 and/or outdoor radio 209)) in the vicinity of mobile device 103, compare information associated with the scanned sources with a set of indoor-only RF sources, and determine, based on the comparison, whether mobile device 103 has transitioned between indoor and outdoor.

In one example, control logic 205 is configured to determine identification (e.g. MAC address) of the RF sources scanned in the vicinity of mobile device 103 and compare the determined identification with the identification of indoor-only sources, which are stored, for example, in database 109 of FIG. 1. Additionally or alternatively, control logic 205 is configured to retrieve information from database 109 through network 111 and store the information in a memory (not shown) in mobile device 103. Either way, the stored identification information is known a priori.

When control logic 205 determines that the set of currently scanned RF sources includes one or more indoor-only sources, control logic 205 can enable indoor positioning logic 201 to use the indoor navigation algorithms for positioning and/or tracking purposes. In one example, control logic 205 can also disable outdoor positioning logic 203, reduce the power used by logic 203, and/or cause logic 203 to minimize its activities in order to save power for mobile device 103.

Additionally, when, control logic 205 determines that the set of scanned RF sources does not include indoor-only sources, control logic 205 can enable outdoor positioning logic 203 to use outdoor navigation algorithms for positioning and/or tracking purposes. In one example, control logic 205 can disable indoor positioning logic 201, reduce the power used by logic 201, and/or cause logic 201 to minimize its activities in order to save power for mobile device 103.

Figure 3:
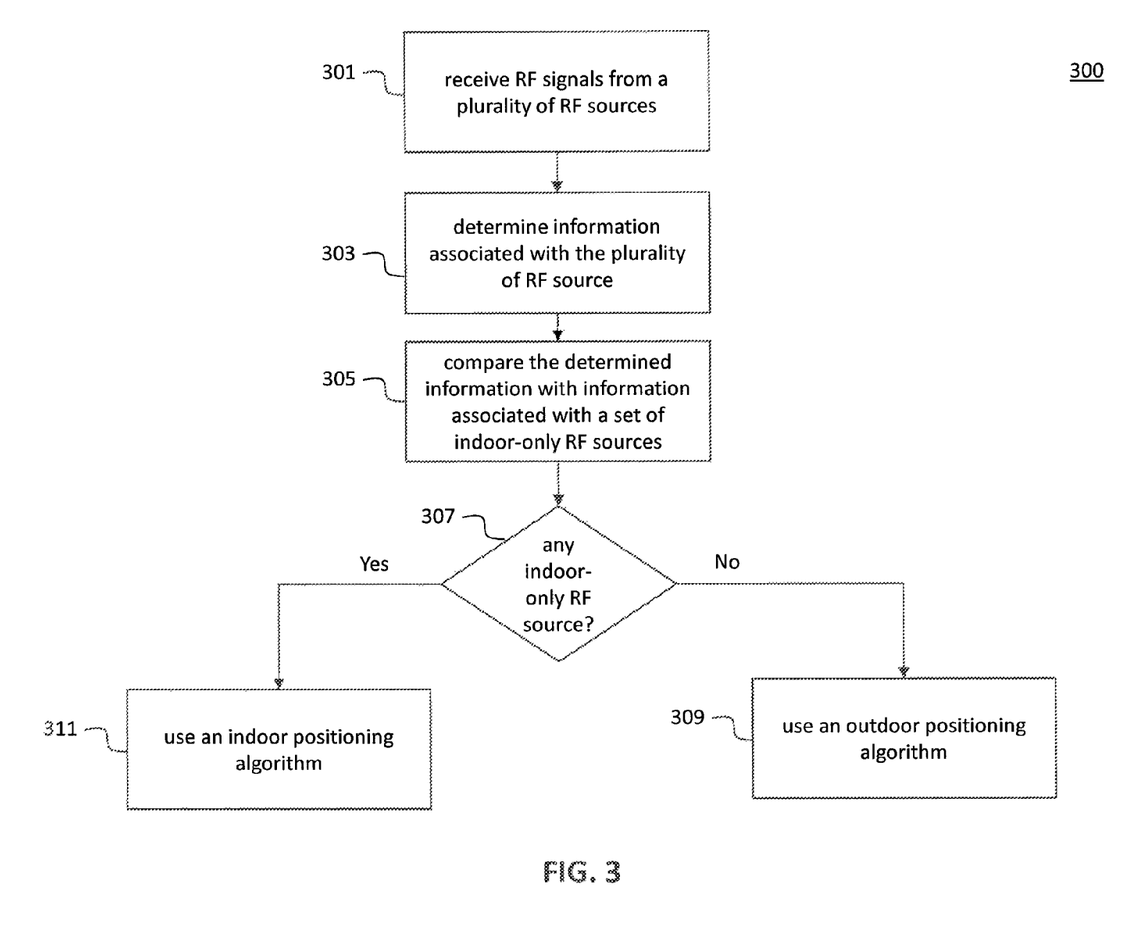
FIG. 3 is a flowchart illustrating a method, in accordance with an embodiment of the present disclosure.

FIG. 3 is a flowchart depicting a method 300, according to an embodiment of the present disclosure. For example, method 300 can determine whether a mobile receiver has transitioned between indoor and outdoor to automatically use the proper navigation algorithm. In one example, method 300 is performed by system 100. It is to be appreciated not all steps may be needed, and the steps may not be performed in the same order as shown in FIG. 3. Reference is made to system 100 in FIG. 1 merely for convenience of discussion. Other systems may be used to perform the method as will be understood by those skilled in the arts.

In step 301, a mobile device 103 receives RF signals from a plurality of RF sources, such as RF sources 107a-107n. It is noted that although reference is made to RF sources, other sources used for IPS can also be used in these embodiments.

In step 303, mobile device 103 determines information associated with the plurality of RF sources from which the RF signals are received. The information can include, but not limited to, signal strength, signal time of arrival, signal angle of arrival, identification of the RF sources (e.g. MAC address), location of the RF source, etc.

In step 305, mobile device 103 can compare the determined information associated with the plurality of the RF source with a priori information associated with a set of indoor-only RF sources, where the a priori information may be stored in a memory, for example. The a priori information may be stored on the mobile device, or accessible by the mobile device, using a communication network.

In step 307, a determination is made whether the plurality of RF sources, from which the RF signals are received, include any indoor-only RF source. If the plurality of RF sources does not include indoor-only RF sources, an outdoor positioning/navigation algorithm is selected for use in step 309. However, if the plurality of RF sources includes one or more indoor-only RF sources, an indoor positioning/navigation algorithm is selected for use in step 311.

Figure 4A:
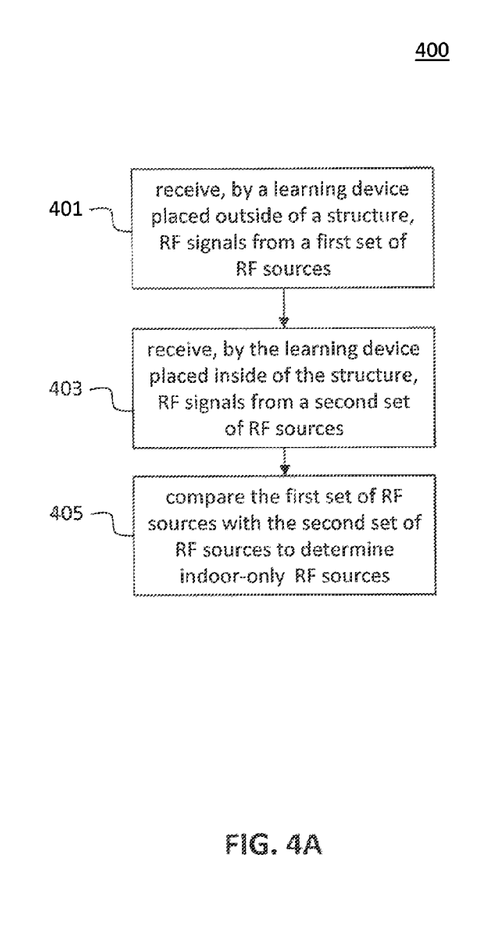
FIGS. 4A and 4B illustrate flowcharts illustrating methods, in accordance with an embodiment of the present disclosure.
Figure 4B:
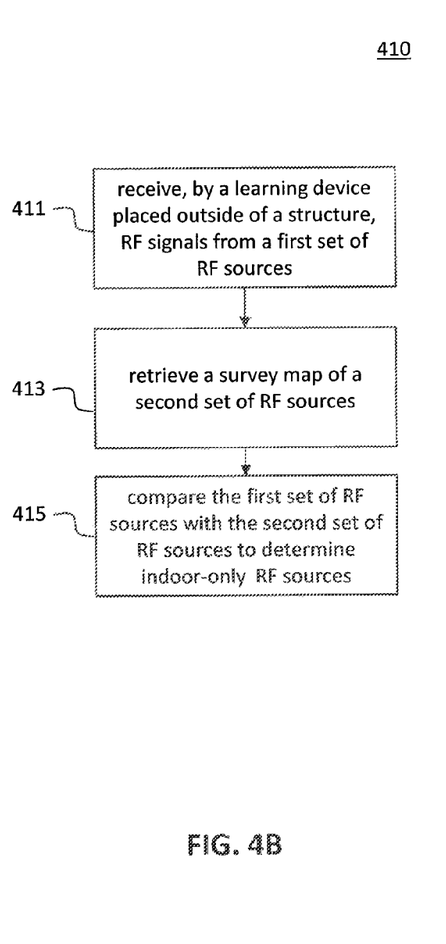

FIGS. 4A and 4B illustrate flowcharts depicting methods 400 and 410, according to embodiments of the present disclosure. For example, methods 400 and 410 can be used to build up a database of indoor-only sources (such as RF sources). It is to be appreciated not all steps may be needed or performed in the order shown in FIGS. 4A and 4B. Reference is made to system 100 in FIG. 1 merely for convenience of discussion. Other system may be used to perform the method.

According to the embodiment illustrated in FIG. 4A, in step 401 of method 400, a learning device can be used to survey outside of a structure, e.g., structure 105 of FIG. 1, to collect RF signals transmitted by RF sources inside the structure. The learning device can collect information associated with a first set of RF sources.

In step 403, the learning device can be used to survey inside the structure to collect information associated with a second set of RF sources.

In step 405, the first and second set of RF sources can be compared such that a set of indoor-only RF source can be determined.

According to the embodiment illustrated in FIG. 4B, in step 411 of method 410, a learning device can be used to survey outside of a structure, e.g., structure 105 of FIG. 1, to collect RF signals transmitted by RF sources inside the structure. The learning device can collect information associated with a first set of RF sources.

In step 413, a survey map of a second set of RF sources inside the structure is retrieved.

In step 415, the first and second set of RF sources can be compared such that a set of indoor-only RF source can be determined.

Figure 5:
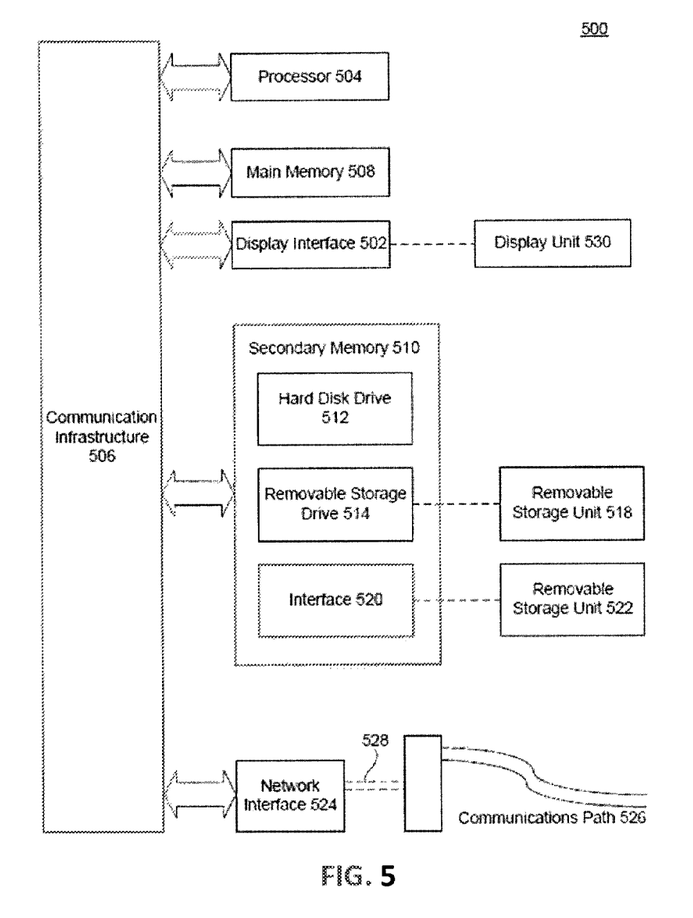
FIG. 5 illustrates a computer system that can utilized to implement one or more embodiments of the present disclosure.

Various aspects of the present disclosure can be implemented by software, firmware, hardware, or a combination thereof. FIG. 5 illustrates an example computer system 500 in which the present disclosure, or portions thereof, can be implemented as computer-readable code. For example, control logic 205 and/or the method 300 and 400 can be implemented by computer system 500 as well as indoor and outdoor positioning logic 201 and 203. Various embodiments of the disclosure are described in terms of this example computer system 500. After reading this description, it will become apparent to a person skilled in the relevant art how to implement the disclosure using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present disclosure as discussed herein. In particular, the computer programs, when executed, enable processor 504 to implement the processes of the present disclosure. Accordingly, such computer programs represent controllers of the computer system 500. Where the disclosure is implemented using software, the software may be stored in a computer program product and loaded into computer system 500 using removable storage drive 514, interface 520, hard drive 512 or communications interface 524.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The exemplary embodiments described herein are provided for illustrative purposes, and are not limiting. Other exemplary embodiments are possible, and modifications may be made to the exemplary embodiments within the spirit and scope of the disclosure.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with the following claims and their equivalents.

What is claimed is:

1. A method, comprising:
   receiving, by a mobile device, radio frequency (RF) signals from a plurality of RF sources, wherein at least one of the plurality of RF sources is located inside a structure;
   determining information associated with the plurality of RF sources;
   comparing the determined information with a priori information associated with a set of indoor-only RF sources;
   determining whether the plurality of RF sources includes at least one of the set of indoor-only RF sources;
   if the plurality of RF sources includes the at least one of the set of indoor-only RF sources, using an indoor positioning algorithm to determine a location of the mobile device; and
   if the plurality of RF sources does not include the at least one of the set of indoor-only RF sources, using an outdoor positioning algorithm to determine the location of the mobile device.

2. The method of claim 1, further comprising:
   reducing power used by one or more receivers used for the outdoor positioning algorithm in the mobile device, if the plurality of RF sources includes the at least one of the set of indoor-only RF sources.

3. The method of claim 1, wherein the comparing comprises:
   accessing a database storing the a priori information associated with the set of indoor-only RF sources.

4. The method of claim 3, wherein the accessing a database comprises:
   downloading the database to the mobile device.

5. An apparatus, comprising:
   a radio receiver configured to receive radio frequency (RF) signals from a plurality of RF sources, wherein at least one of the plurality of RF sources is located inside a structure; and
   a control logic configured to:
     determine information associated with the plurality of RF sources;
     compare the determined information with a priori information associated with a set of indoor-only RF sources;
     determine whether the plurality of RF sources includes at least one of the set of indoor-only RF sources;
     use an indoor positioning algorithm to determine a location of the apparatus when the plurality of RF sources includes the at least one of the set of indoor-only RF sources; and
     use an outdoor positioning algorithm to determine the location of the apparatus when the plurality of RF sources does not include the at least one of the set of indoor-only RF sources.

6. The apparatus of claim 5, wherein the control logic is further configured to:
   reduce power used by one or more receivers used for the outdoor positioning algorithm when the plurality of RF sources includes the at least one of the set of indoor-only RF sources.

7. The apparatus of claim 5, wherein the comparing comprises:
   accessing a database storing the a priori information associated with the set of indoor-only RF sources.

8. The method of claim 7, wherein the accessing a database comprises:
   downloading the database to the mobile device.

9. An article of manufacture including a non-transitory computer-readable storage medium having instructions stored thereon, execution of which by a computing device causes the computing device to perform operations comprising:
   receiving, by a mobile device, radio frequency (RF) signals from a plurality of RF sources, wherein at least one of the plurality of RF sources is located inside a structure;
   determining information associated with the plurality of RF sources;
   comparing the determined information with a priori information associated with a set of indoor-only RF sources;
   determining whether the plurality of RF sources includes at least one of the set of indoor-only RF sources;
   using an indoor positioning algorithm to determine a location of the mobile device if the plurality of RF sources includes the at least one of the set of indoor-only RF sources; and
   using an outdoor positioning algorithm to determine the location of the mobile device if the plurality of RF sources does not include the at least one of the set of indoor-only RF sources.

10. The article of manufacture of claim 9, wherein the operations further comprise:
    reducing power used by one or more receivers used for the outdoor positioning algorithm, if the plurality of RF sources includes the at least one of the set of indoor-only RF sources.

11. The article of manufacture of claim 9, wherein the comparing comprises:
accessing a database storing the a priori information associated with the set of indoor-only RF sources.

12. The article of manufacture of claim 11, wherein the accessing a database comprises:
downloading the database to the mobile device.

13. The method of claim 1, wherein the comparing comprises:
distinguishing between the set of indoor-only RF sources and indoor RF sources that are not indoor-only RF sources. so that indoor RF sources that are not indoor-only RF sources are not considered in the step of determining.

14. The apparatus of claim 5, wherein the control logic is further configured to distinguish between the set of indoor-only RF sources and indoor RF sources that are not indoor-only RF sources, so that indoor RF sources that are not indoor-only RF sources are not considered when it is determined whether the plurality of RF sources includes at least one of the set of indoor-only RF sources.

15. The article of manufacture of claim 9, wherein the comparing comprises distinguishing between the set of indoor-only RF sources and indoor RF sources that are not indoor-only RF sources, so that indoor RE sources that are not indoor-only RF sources are not considered in the operation of determining.

16. An apparatus. comprising:
a database that stores a priori information associated with a set of indoor-only radio frequency (RF) sources located inside a structure, wherein the a priori information distinguishes between the set of indoor-only RF sources and a set of indoor RF sources located inside the structure that are not indoor-only RF sources; and
a control logic configured to:
receive information associated with a plurality of measured RF sources, the information including identities of the plurality of measured RF sources;
compare the identities of the measured RF sources with the a priori information associated with the set of indoor-only RF sources stored in the database; and
select an indoor positioning algorithm or an outdoor positioning algorithm based on whether at least one of the identities of the plurality of measured RF sources matches that of one of the set of indoor-only RF sources.

17. The apparatus of claim 16, wherein the control logic is further configured to select the indoor positioning algorithm to determine a location of the apparatus when at least one of the identities of the plurality of measured RF sources matches that of one of the set of indoor-only RF sources.

18. The apparatus of claim 16, wherein the control logic is further configured to select the outdoor positioning algorithm to determine a location of the apparatus when none of the identities of the plurality of measured RF sources matches that of one of the set of indoor-only RF sources.

19. The apparatus of claim 16, wherein the control logic is further configured to select the outdoor positioning algorithm to determine a location of the apparatus when at least one of the identities of the plurality of measured RF sources matches that of one of the set of indoor RF sources, and none of the identities of the plurality of measured RF sources matches that of one of the set of indoor-only RF sources.

* * * * *

UNITED STATES PATENT AND TRADEMARK OFFICE
CERTIFICATE OF CORRECTION

PATENT NO. : 9,008,694 B2  Page 1 of 1
APPLICATION NO. : 13/538296
DATED : April 14, 2015
INVENTOR(S) : Fuller et al.

It is certified that error appears in the above-identified patent and that said Letters Patent is hereby corrected as shown below:

In the Claims

Column 13, line 12, Claim 13, please replace "sources. so" with --sources, so--.

Column 13, line 25, Claim 15, please replace "indoor RE sources" with --indoor RF sources--.

Signed and Sealed this
Eighth Day of September, 2015

Michelle K. Lee
*Director of the United States Patent and Trademark Office*